United States Patent
Williams

[11] Patent Number: 6,152,516
[45] Date of Patent: Nov. 28, 2000

[54] RETRACTABLE TOP COVER FOR RECREATIONAL VEHICLE

[76] Inventor: Wilfred J. Williams, 10137 Quarry Hill Pl., Parker, Colo. 80134

[21] Appl. No.: 09/223,098

[22] Filed: Dec. 30, 1998

Related U.S. Application Data

[63] Continuation-in-part of application No. 08/838,076, Apr. 15, 1997, abandoned.

[51] Int. Cl.[7] ..................................................... B60J 11/00
[52] U.S. Cl. ............................................ 296/98; 296/136
[58] Field of Search ..................... 296/136, 98; 150/166; 160/23.1, 370.22

[56] References Cited

U.S. PATENT DOCUMENTS

| | | |
|---|---|---|
| 3,498,666 | 3/1970 | Harrawood . |
| 3,515,428 | 6/1970 | Killion . |
| 3,549,198 | 12/1970 | Cappelo ...................................... 296/98 |
| 3,833,011 | 9/1974 | Duffy . |
| 4,023,857 | 5/1977 | Killion . |
| 4,225,175 | 9/1980 | Fredin . |
| 4,366,979 | 1/1983 | Pillot ....................................... 296/160 |
| 4,516,802 | 5/1985 | Compton . |
| 4,669,773 | 6/1987 | LeVee ...................................... 296/37.7 |
| 4,673,208 | 6/1987 | Tsukamoto . |
| 4,805,654 | 2/1989 | Wang et al. . |
| 4,874,196 | 10/1989 | Goldstein et al. . |
| 4,900,081 | 2/1990 | Lee .......................................... 296/136 |
| 4,955,661 | 9/1990 | Mattice . |
| 4,981,319 | 1/1991 | Gerzeny et al. ..................... 296/165 X |
| 5,031,955 | 7/1991 | Searfoss . |
| 5,065,805 | 11/1991 | Barrett et al. . |
| 5,171,056 | 12/1992 | Faludy et al. . |
| 5,205,605 | 4/1993 | Haddad, Jr. . |
| 5,240,303 | 8/1993 | Hageman . |
| 5,292,169 | 3/1994 | O'Brian . |
| 5,328,228 | 7/1994 | Klassen . |
| 5,340,187 | 8/1994 | Haddad, Jr. . |
| 5,368,056 | 11/1994 | Riggi, Jr. . |
| 5,380,058 | 1/1995 | Short et al. . |
| 5,482,347 | 1/1996 | Clarys et al. . |
| 5,762,393 | 6/1998 | Darmas, Sr. ........................ 296/136 X |
| 5,829,818 | 11/1998 | O'Daniel ................................... 296/98 |

*Primary Examiner*—Joseph D. Pape
*Attorney, Agent, or Firm*—Dorsey & Whitney LLP

[57] ABSTRACT

A retractable top cover for covering a roof of a recreational vehicle having opposed side walls and opposed end walls with the roof surmounting the walls. The retractable top cover comprises a flexible top cover stored on a spring-biased roller mounted in an elongated housing mounted on the vehicle roof adjacent to and extending along one of the side walls. A pair of lazy tongs extension mechanisms, one mounted at one end of the housing, extend and retract the flexible top cover. A drive motor is connected to the lazy tongs by a worm screw mechanism.

20 Claims, 12 Drawing Sheets

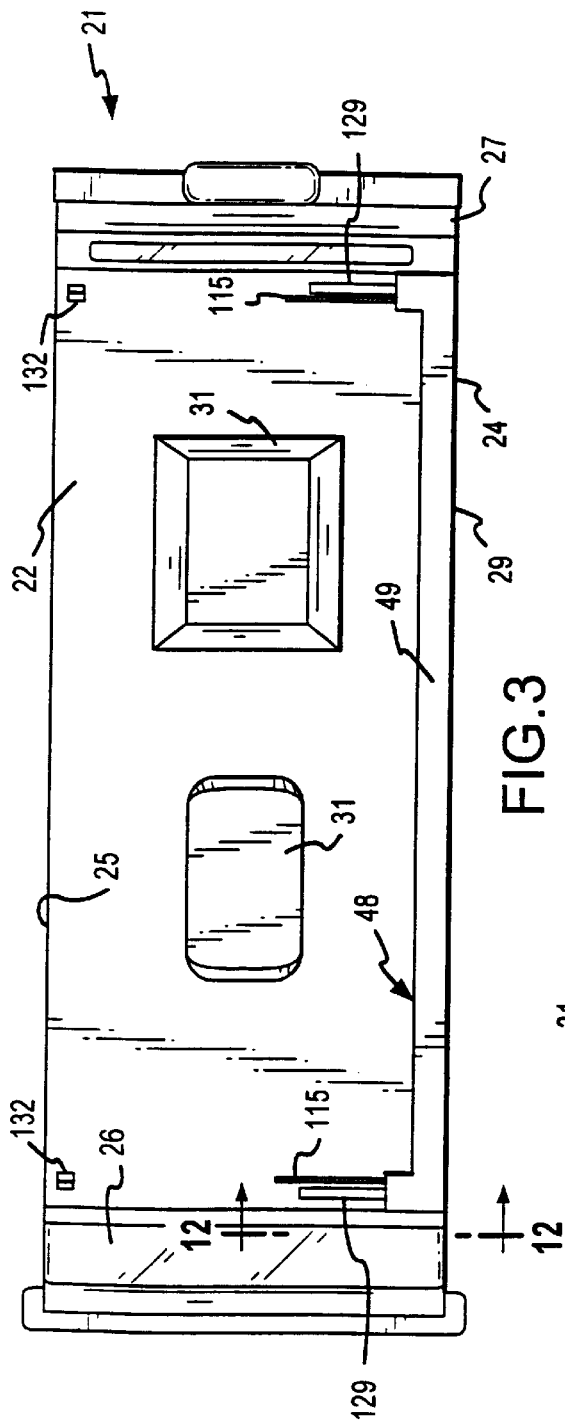
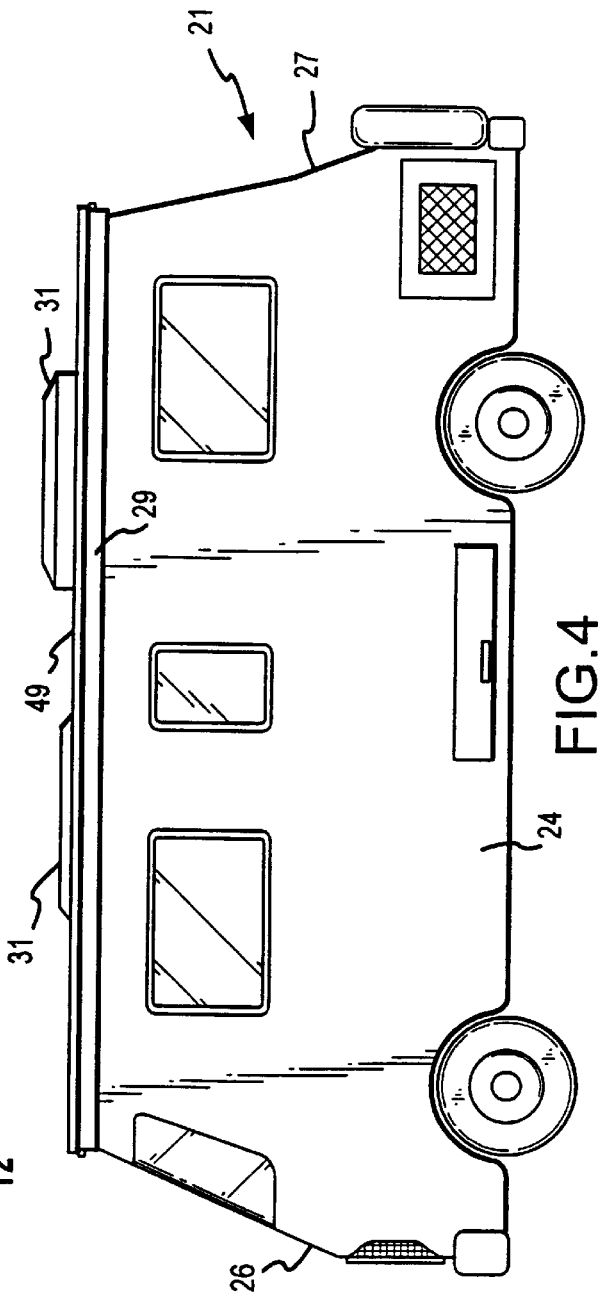

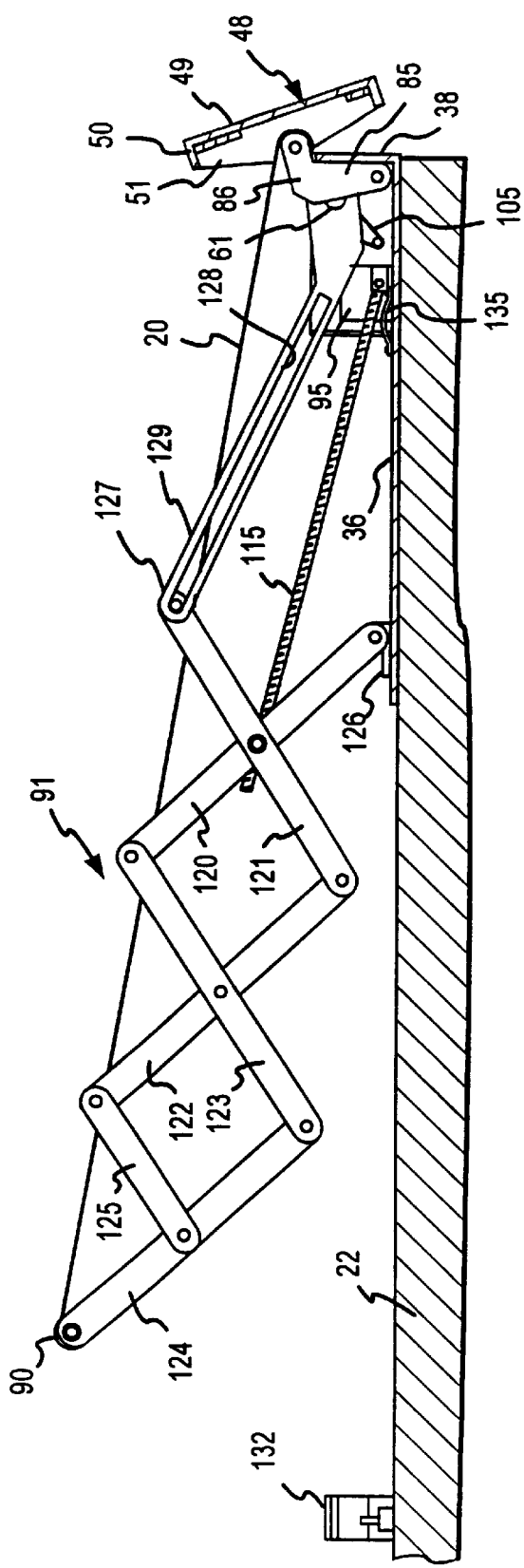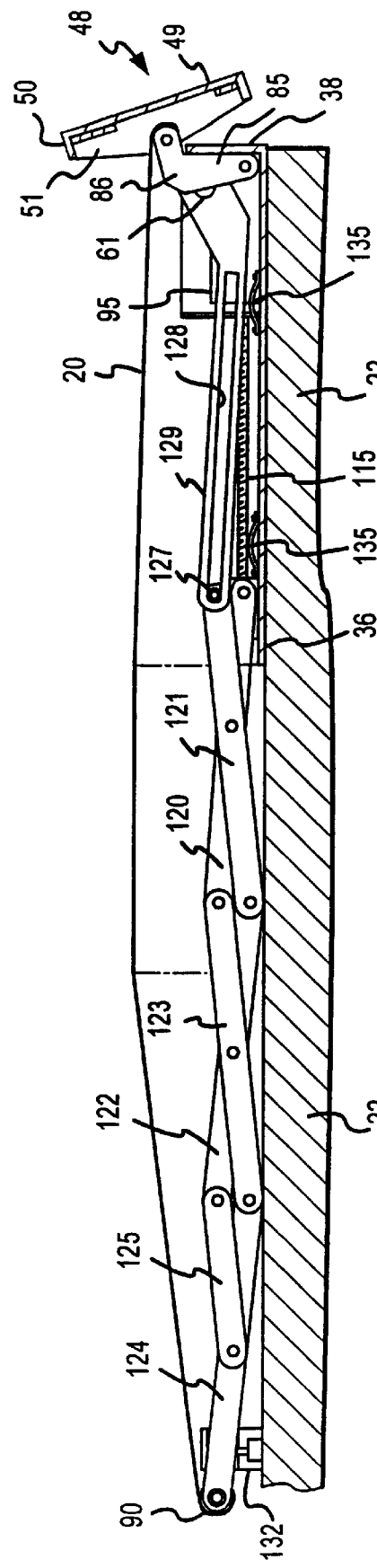

RETRACTABLE TOP COVER FOR RECREATIONAL VEHICLE

CROSS-REFERENCE TO RELATED APPLICATION

The present application is a continuation-in-part of application Ser. No. 08/838,076, filed Apr. 15, 1997, now abandoned and entitled "Top Cover for Recreational Vehicle," which is incorporated herein by reference.

FIELD OF THE INVENTION

The present invention relates to retractable top covers for recreational vehicles, modular homes, and the like, and more particularly to a mechanism for extending and retracting a cover over the roof of a vehicle or home.

BACKGROUND OF THE INVENTION

Covers for vehicles such as a load-carrying truck body are known in the art. See, for example, U.S. Pat. No. 4,673,208, issued Jun. 16, 1987 to M. Tsukarnoto for "Power-Operated Extendable and Retractable Cover for Truck Beds." This patent discloses an elongated roller which is movable back and forth transversely across the bed of a truck from one side to the other. The roller carries a rolled cover sheet, which is unrolled and re-rolled during the back and forth movement to cover a load in the truck bed. Levers pivotally mounted at opposite ends of the truck carry the roller and are moved by hydraulic power cylinders controlled from inside the cab of the truck. The roller is driven by a chain-and-sprocket arrangement and an elastic draw cord and backup plate arrangement at opposite ends of the truck bed secures and seals the cover sheet at the opposite ends of the bed.

A cover for a slide-out or expandable section of a trailer or like vehicle is shown in U.S. Pat. No. 4,955,661, issued Sep. 11, 1990, to R. Mattice for "Environmentally Protected Expandable Trailer." This patent discloses an automatically retracting cover over the expandable section to prevent accumulation of snow, water, dirt or the like on top of the expandable section.

A top cover and awning combination for an expandable section of a recreational vehicle is shown in U.S. Pat. No. 5,171,056, issued Dec. 15, 1992, to T. Faludy, et al. for "Retractable Awning for Slide-Out Unit on Mobile Home, Recreational Vehicle or the Like." The retractable awning and top cover is secured along an inner edge to the side of the mobile home. The opposite edge of the awning is secured to a torsionally biased roll bar rotatably mounted on the outer ends of support arms, which are pivotally mounted to the outer face of the slide-out unit. The awning sheet overlies the top of the slide-out unit when it is extended and further provides an awning for a window in the slide-out unit.

A need exists for an improved top cover, and improved mechanism for deploying and retracting the top cover, for shading the roof of a recreational vehicle or like structure.

SUMMARY OF THE INVENTION

The present invention is embodied in a deployable and retractable top cover for covering and shading the roof of, for example, a recreational vehicle such as a motor home, trailer, or camper. The vehicle conventionally has opposed side and end walls with the roof surmounting the walls at the top edges thereof. The retractable top cover includes an elongated housing mounted on the vehicle roof adjacent to and extending along the edge of the roof adjacent one of the side walls and extending between the front and rear end walls of the vehicle. A flexible top cover such as a vinyl, fabric, canvas or tarpaulin or a slatted material is wound on a torsional spring biased roller supported within the housing and extending the length thereof.

One edge of the flexible top cover is secured to the roller and the other edge is secured to a bar or rod supported at each end by a lazy tongs or scissors mounted in the housing. The lazy tongs form a part of a lazy tongs extension mechanism, which may include a drive motor and a worm shaft operatively coupling the drive motor to each lazy tongs. Operation of the drive motor in one direction extends the lazy tongs, pulling the flexible top cover from the roller and extending it over the roof of the vehicle. Operation of the motor in the opposite direction retracts the flexible top cover and allows it to be wound on the spring biased roller. When the flexible top cover is in its fully extended position, latches secure the rod or bar to the roof of the vehicle.

The top cover housing may include a lid or housing cover which is powered to the open or closed position by an appropriate drive motor and gear mechanism. In its closed position, the housing cover seals the housing to contain and protect the roller and flexible top cover wound on it. To deploy the flexible top cover, the housing cover is lifted by the cover drive motor and gear mechanism to open the housing to permit the flexible top cover to be deployed over the vehicle roof.

The lazy tongs may include a lost motion connection to allow the lazy tongs to be collapsed in stowed position against the roof of the vehicle and, in use, to be extended upwardly and forwardly in order to deploy the flexible top cover over the vehicle roof and over devices and materials stowed on the roof.

While the invention is described in connection with a recreational vehicle, it may be utilized to advantage with like structures, such as modular buildings and similar structures in which it is desired to shade at least a portion of the structure to help modulate internal temperatures.

BRIEF DESCRIPTION OF THE DRAWINGS

The accompanying drawings are incorporated in and constitute a part of this specification and, together with the description, explain the advantages and principles of the invention. In the drawings.

FIG. 3 is a top plan view of the motor home shown in FIG. 1;

FIG. 4 is a side-elevation view of the motor home shown in FIG. 1;

FIG. 16 is an enlarged section view similar to FIG. 15 but showing the retractable top cover in a still further deployed position;

FIG. 17 is an enlarged section view similar to FIG. 16 but showing the retractable top cover in a fully deployed position;

DETAILED DESCRIPTION

Figure 1:
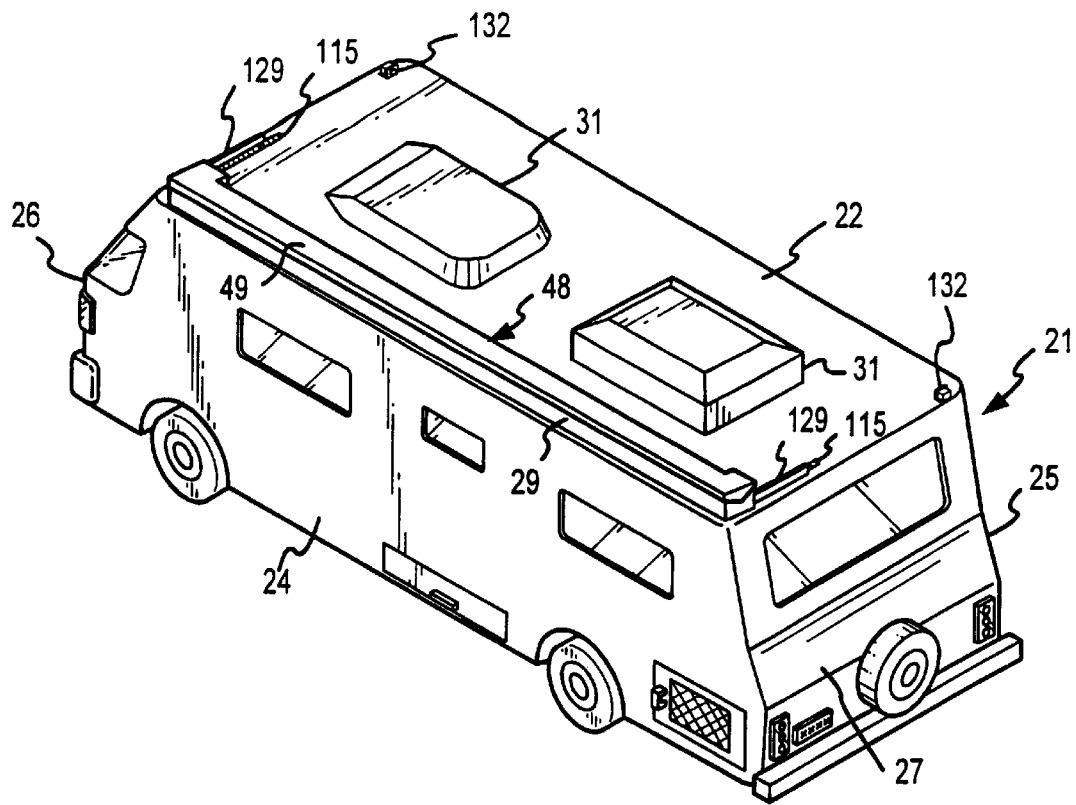
FIG. 1 is a perspective view of a motor home having mounted thereon a retractable top cover embodying the present invention.
Figure 2:
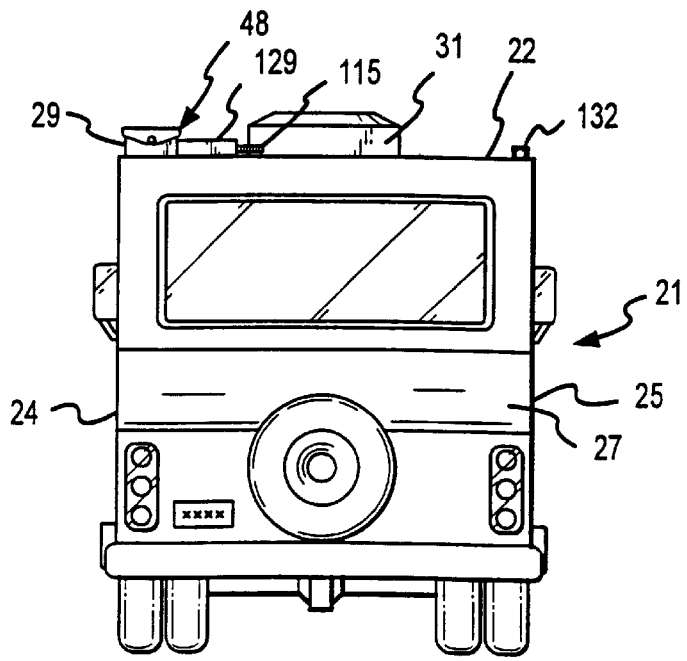
FIG. 2 is a rear-end view of the motor home shown in FIG. 1.

Embodiments consistent with the present invention include a mechanism for extending and retracting a flexible top cover over the roof of, for example, a recreational vehicle. A housing located on top of the vehicle contains the mechanism, and the housing includes a lid or cover. In order to cover the vehicle, the mechanism first opens the cover of the housing and then extends the flexible top cover from the housing over the top of the vehicle.

The mechanism for extending the flexible top cover includes a lazy tongs. After opening the housing cover, the mechanism lifts up the lazy tongs in a folded position and then extends the lazy tongs. An end of the lazy tongs are attached to an end of the flexible top cover, and the other end of the flexible top cover is attached to a retractable roller inside the housing. As the lazy tongs extends, the flexible top cover unrolls from the roller.

In a similar manner, the flexible top cover may be retracted into the housing. The lazy tongs first retracts, and during the retraction the flexible top cover rolls up on the roller due to tension applied by the roller. After retraction of the lazy tongs, the mechanism lowers the folded lazy tongs to lie flat in the housing, and then it lowers the housing cover to enclose the mechanism.

Cover Mechanism

A top cover 20 (FIG. 5) for a recreational vehicle 21, embodying the present invention, as shown in FIGS. 1–5, serves to cover a top panel or roof 22 of the vehicle 21 and shield it from the sun to assist in maintaining a uniform interior temperature within the vehicle 21. The vehicle 21 includes opposed side walls 24–25 and end walls 26–27, all supporting at their upper edges the surmounting vehicle roof 22. The vehicle 21 may be, for example, a self-contained motor home, a camper mounted on the back of a pickup truck, or a trailer. Regardless of the vehicle, the top cover 20 is stored in a storage box or housing 29 mounted on and extending along one edge of the vehicle roof 22 adjacent side wall 24. The top cover 20 is deployed from the housing 29 towards the opposite side wall 25 over the width of the vehicle 21. When the top cover 20 is deployed, fasteners 132 secure the top cover 20 to the vehicle roof 22 or side wall 25.

The top cover 20 may cover ventilators, skylights, air conditioning units and the like 31 (visible in FIGS. 1–5) extending upwardly from the vehicle roof 22. Alternatively, the top cover 20 may include appropriate openings 23 (FIG. 5) cut into it to accommodate the projecting devices 31. The top cover 20 may also cover objects stored in racks (not shown) on the vehicle roof 22, such as bicycles, lawn chairs, and the like. The top cover 20 is conventionally retracted and stored within the housing 29 when the vehicle 21 is moving, being deployed to cover the vehicle roof 22 when the vehicle 21 is parked, for example, at a campsite.

The top cover 20 may be formed of any appropriate flexible material such as a flexible fabric, or tarpaulin or a flexible cover formed by jointed slats (not shown) and the like.

Figure 6:
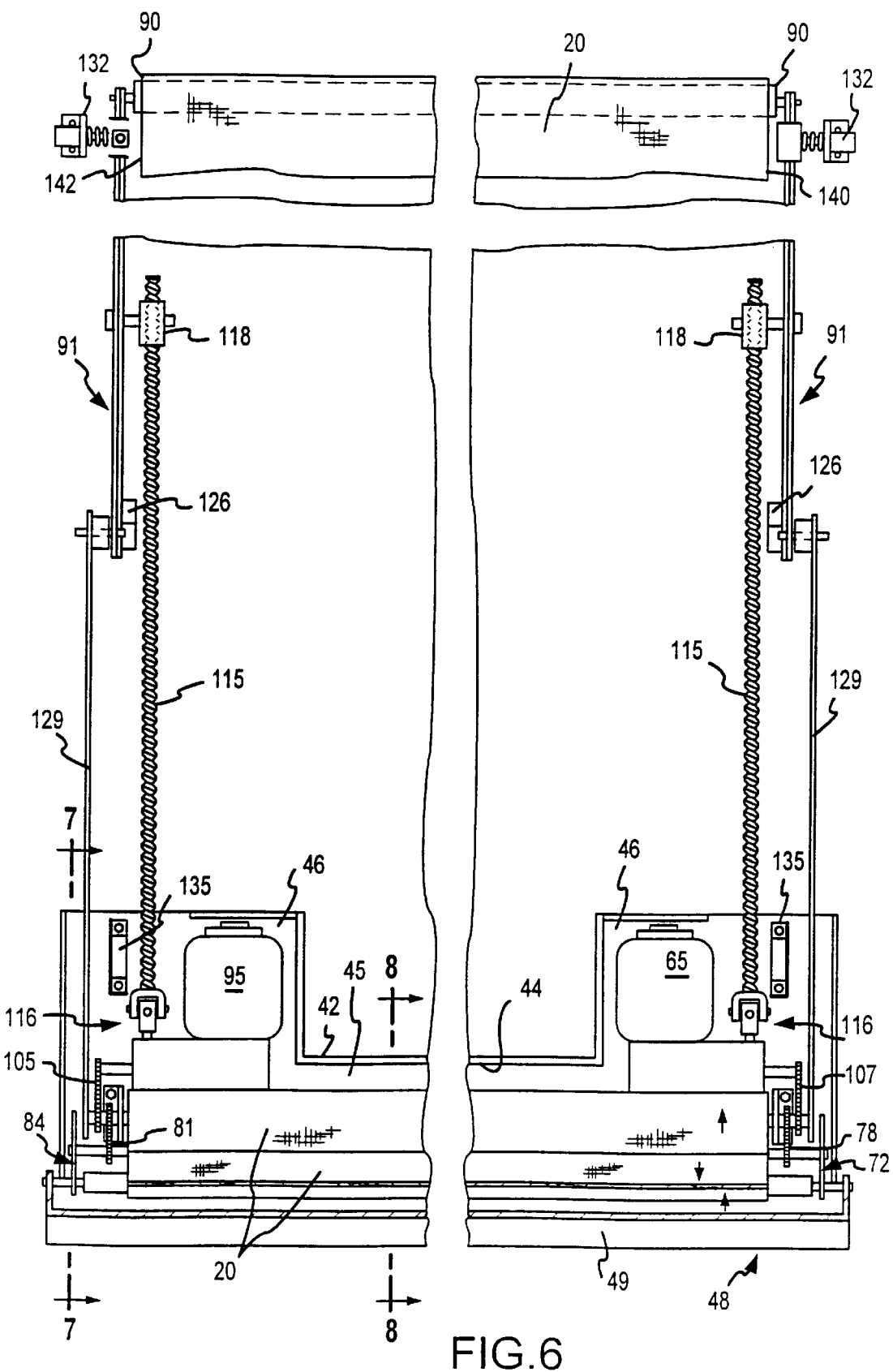
FIG. 6 is an enlarged top plan view of the motor home shown in FIG. 1 with the flexible top cover extended over the roof of a vehicle and partially broken away for clarity.

The housing 29 for the top cover 20 is formed by an elongated mounting plate 35 (FIGS. 7, 9, 10, and 12) having a length extending approximately the width of the vehicle roof 22 to which the top cover 20 is to be affixed. At each end, the plate 35 defines an integral transversely extending elongated leg 36 (best seen in FIGS. 9–11), the plate 35 and its legs 36 defining a generally U-shaped structure if viewed from the top. A back wall 38 and adjoining side walls 39 extend upwardly from the mounting plate 35 along the rear edge 40 (FIG. 7) and side edges 41 (FIGS. 9 and 10), respectively, thereof. A forward wall 42 (FIGS. 9–11) extends upwardly from a forward edge 44 of the mounting plate 35, the central portion of the upstanding forward wall 42 being inset (FIGS. 6 and 9–11) to define an elongated chamber 45 (FIG. 6) and spaced forwardly extending chambers 46 (FIG. 6). An elongated lid or cover (housing cover) 48 (FIGS. 6 and 7) covers the elongated chamber 45 and includes an upper panel 49 and downwardly extending edge lips 50 (FIG. 7) and depending generally triangular end plates or flanges 51. The cover 48 fits over the top of the elongated housing 29, enclosing and sealing the stored top cover 20 when in a storage position (FIGS. 1–3 and 12).

Figure 9:
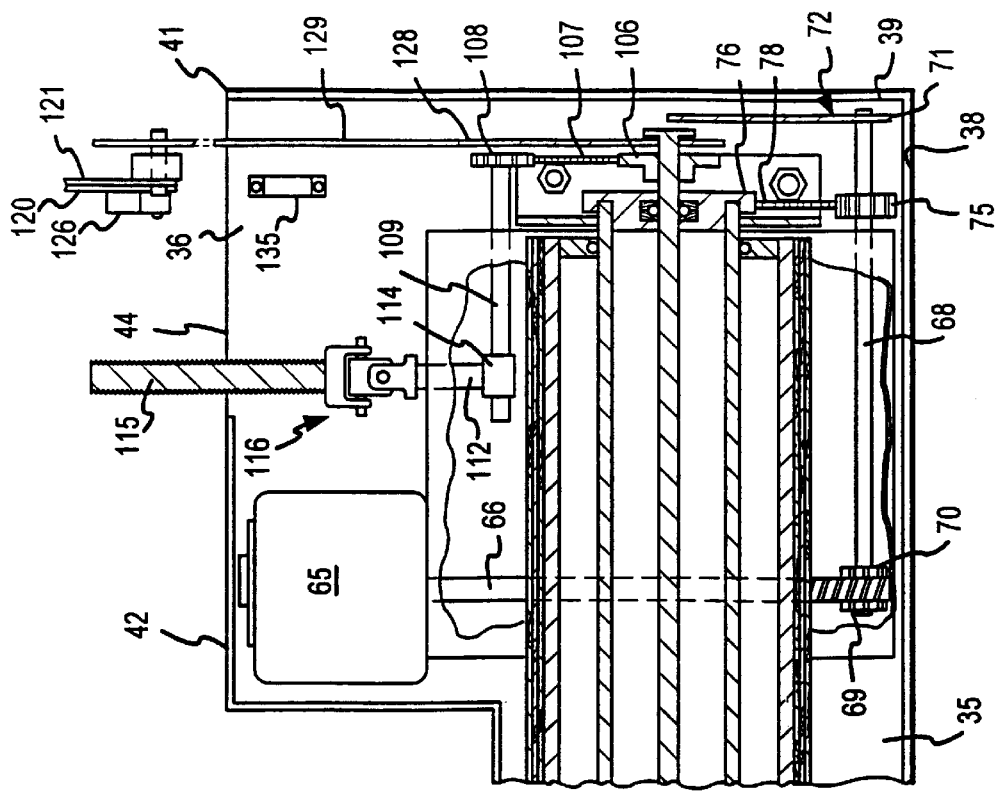
FIG. 9 is a further enlarged section view, with parts broken away, showing details of the right-hand end of the cover lifting and closing mechanism depicted in FIG. 6.
Figure 10:
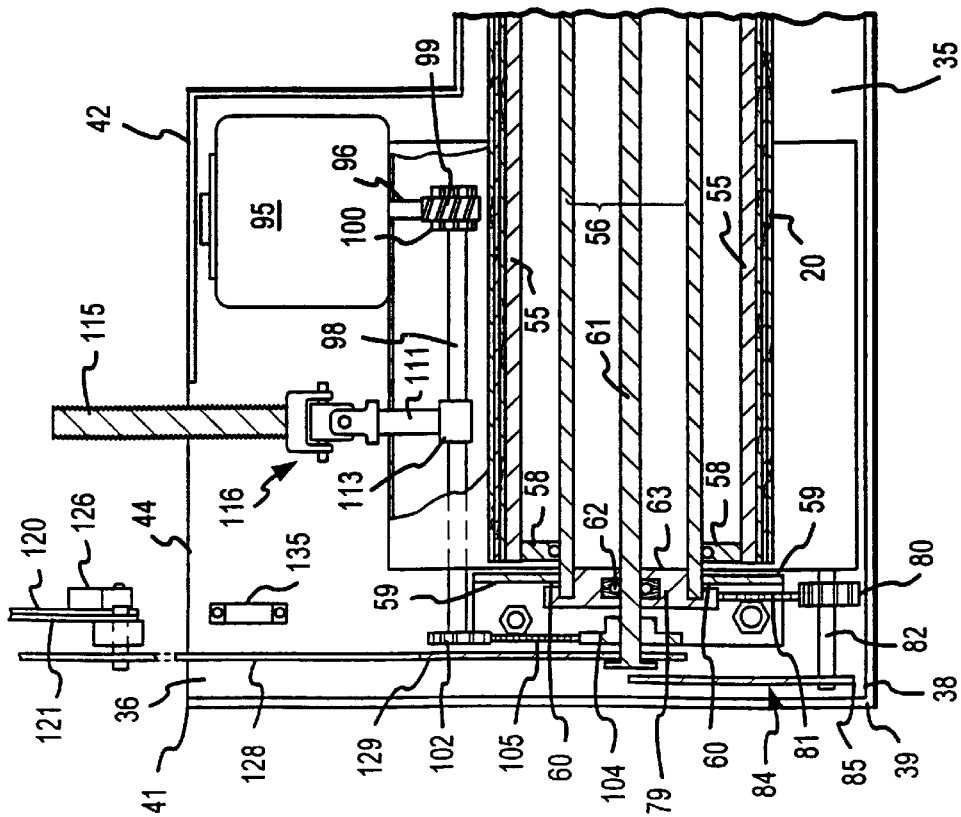
FIG. 10 is a further enlarged section view, with parts broken away, showing details of the left-hand end of the cover lifting and closing mechanism depicted in FIG. 6.
Figure 11:
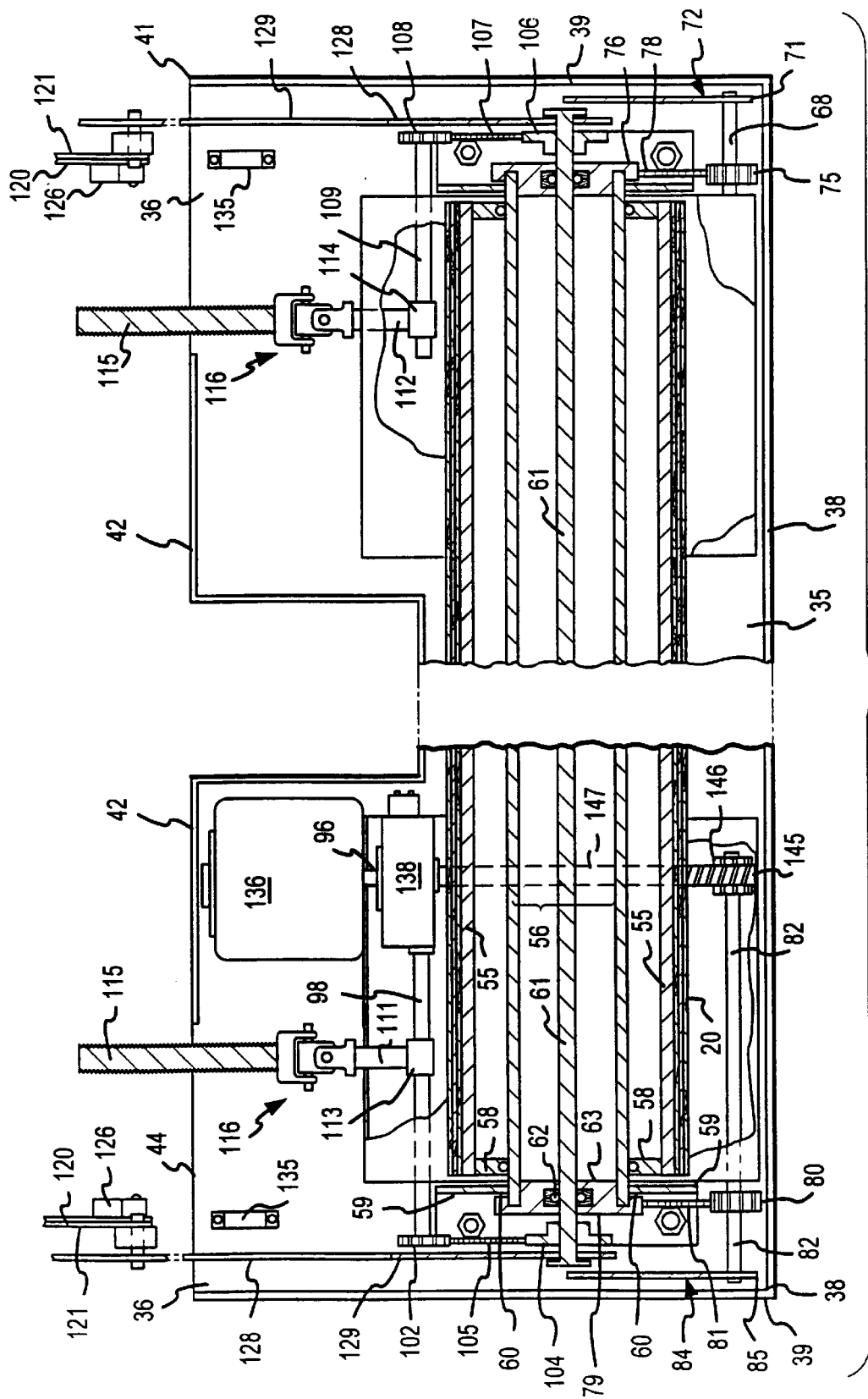
FIG. 11 is an enlarged section view similar to FIGS. 9 and 10 but showing a single drive motor.

The top cover 20 is conveniently stored by winding it onto a torsional spring-biased roller 55 (FIGS. 8–11) from which it may be unrolled and extended over the roof 22 of the vehicle 21. As the top cover 20 is unrolled, the roller spring 57 (FIG. 8) is wound. The wound spring 57 provides a wind-up mechanism for retracting the top cover 20 and winding it for storage on the roller 55. The roller 55 is journaled on a tubular shaft 56 by appropriate bearings 58 (FIGS. 10 and 11). The tubular shaft 56 is in turn journaled at each end in a panel wall 59 by bearings 60, and the tubular shaft 56 supports a main shaft 61 journaled by bearings 62 in the end walls 63 of the tubular shaft 56 (FIGS. 10–11).

Figure 8:
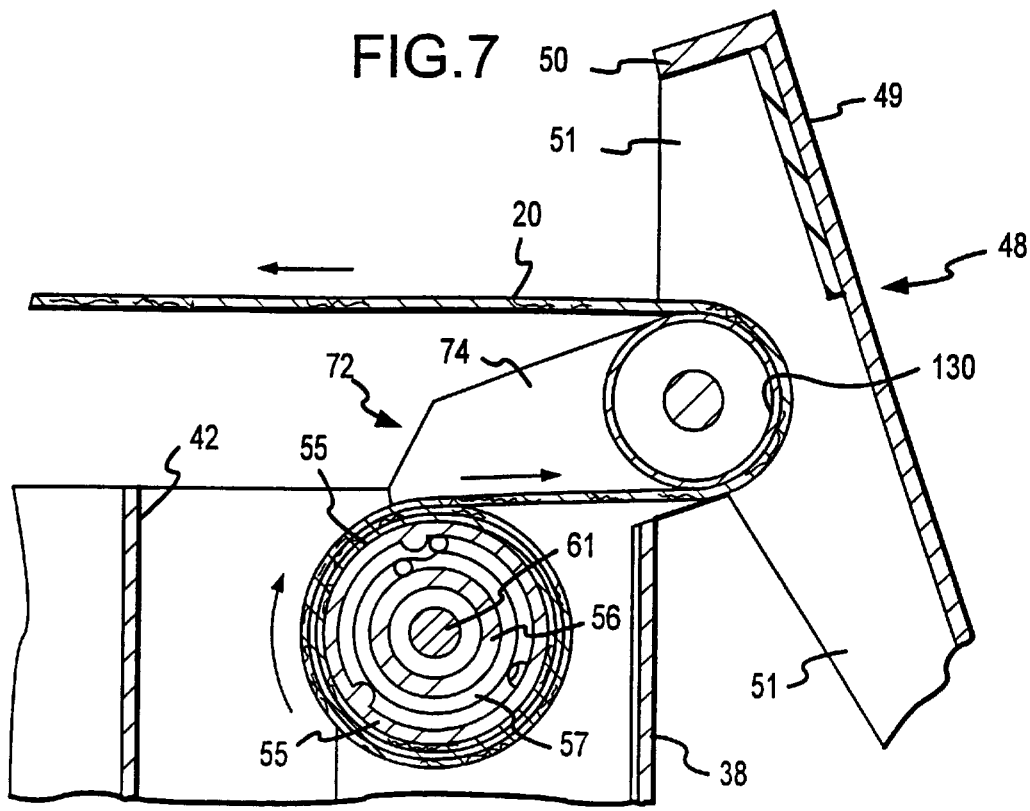
FIG. 8 is a further enlarged section view taken substantially in the plane of line 8—8 on FIG. 6.

A cover and lifting mechanism lifts the housing cover 48 to open the top cover housing 29 and thereby enable the top cover 20 to be unrolled and disposed over the roof 22 of the vehicle 21. To this end, in a first embodiment, a cover drive motor 65 (FIG. 9) is mounted on elongated leg 36 of the housing base plate 35 and includes an output drive shaft 66 geared to a transverse cover drive shaft 68 by a drive gear 69 secured to the motor drive shaft 66 and a follower gear 70 secured to the cover drive shaft 68 (FIG. 9). The cover drive shaft 68 is secured to a lower leg 71 of a bell crank 72 (FIG. 9), the other leg 74 (FIG. 8) of bell crank 72 being secured to the depending end plate or flange 51 at one end of the housing cover 48 (FIG. 8).

To provide for a driving engagement with the cover end plate or flange 51 at the other end of the cover 48 (this second end plate or flange 51 is visible in FIGS. 7, 16, and 17), the cover drive shaft 68 includes a sprocket 75 (FIG. 9) drivingly engaged with a second sprocket 76 on the tubular shaft 56 by a drive belt or chain 78. At its opposite end, the tubular shaft 56 includes a sprocket 79 (FIG. 10) drivingly engaged with a sprocket 80 by a drive chain or belt 81. The sprocket 80 is in turn secured to a shaft 82 affixed to a bell crank 84 on the lower leg 85, the upper leg 86 (FIGS. 7, 16, and 17) of the bell crank 84 being secured to the corresponding end wall 51 of the housing cover 48.

In a first embodiment, the housing cover 48 is opened by actuating the cover drive motor 65 (FIGS. 6 and 9) for rotation in one direction and is closed by reversing the direction of rotation of the cover drive motor 65.

Figure 5:
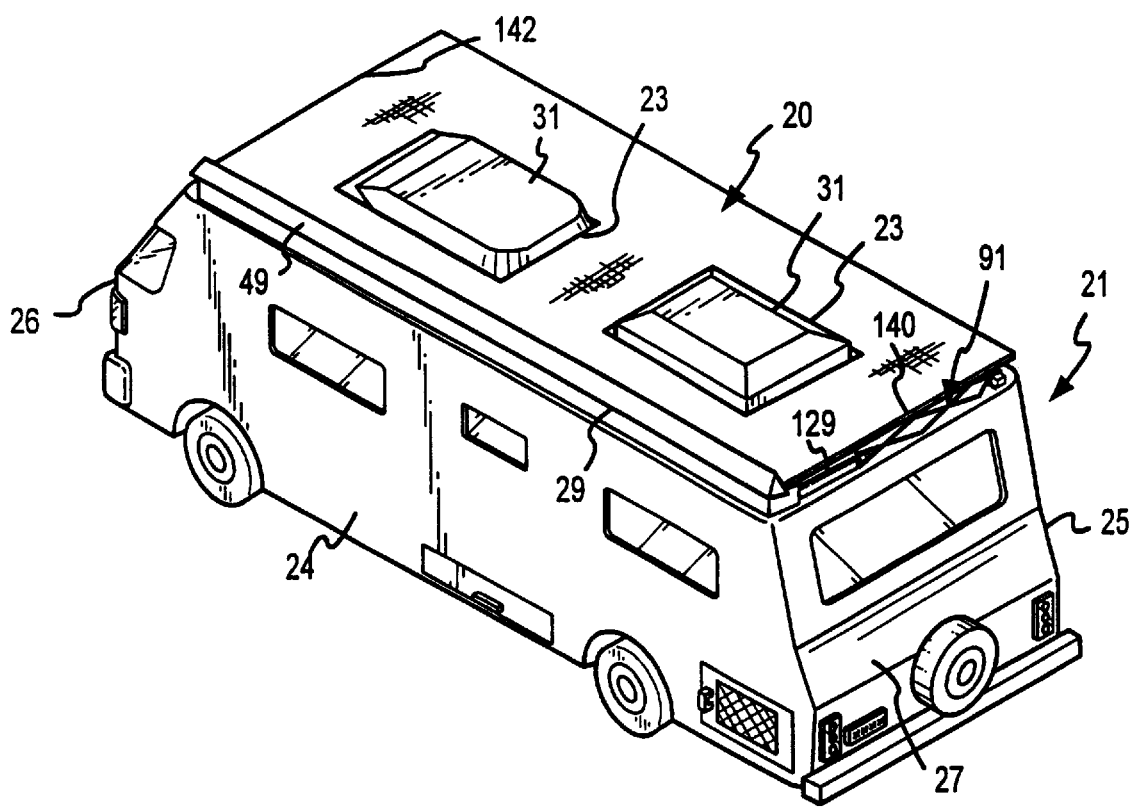
FIG. 5 is a perspective view similar to FIG. 1 but showing the flexible top cover deployed over the top of the vehicle.

In order to unwind the top cover 20 from the roller 55 on which it is stored and to deploy the top cover 20 over the roof 22 of the vehicle 21, a motor driven lazy tongs 91 (FIGS. 5, 6, and 12–18) is provided at each end of the storage roller 55 and housing 29 and alongside each side edge 140, 142 (FIGS. 5 and 6) of the top cover 20. To this end, the top cover 20 is secured at one end edge to the roller 55 (FIGS. 8–10) and at its opposite end edge to a beam or rod 90 (FIGS. 6, 16, and 17). The lazy tongs 91 mounted at each end of the roller 55 and housing 29 engages the end rod 90 of the top cover 20 and moves the rod 90 and attached end edge of the top cover 20 from the storage position (FIGS. 1–3 and 12) to a position overlying the opposite side wall 25 of the recreational vehicle 21 (FIGS. 5, 6, and 17).

In a first embodiment, the lazy tongs 91 is driven by a motor 95 (FIGS. 6 and 10) having an output shaft 96 (FIG. 10) coupled to a first drive shaft 98 by a drive gear 99 and follower gear 100. The drive shaft 98 is journaled in the housing by bearings (not shown) and at its end opposite from the motor 95 includes a sprocket 102 drivingly engaged with a sprocket 104 by a chain or belt 105 (FIG. 10). The second or driven sprocket 104 is secured to one end of the main shaft 61 (FIG. 10). At its opposite end, the main shaft 61 includes a sprocket 106 (FIG. 9) drivingly engaged by a belt or chain 107 with a driven sprocket 108 affixed to a lazy tongs drive shaft 109 journaled by bearings (not shown) in the housing 29.

Each lazy tongs drive shaft 98, 109 (FIGS. 10 and 9, respectively) is drivingly coupled, respectively, to an output shaft 111, 112 by appropriate gears 113, 114. The output shafts 111, 112 are drivingly engaged with externally threaded worm shafts or screws 115 through a universal joint 116 (FIGS. 10 and 9), such that rotation of drive shafts 98, 109 causes corresponding rotation of worm shaft 115 through gears 113, 114. The worm screws 115 are in turn each drivingly engaged with lazy tongs 91 (FIG. 6) by a follower such as an internally threaded sleeve gear or nut 118 pivotally engaged with the lazy tongs 91 at one of the linkage pivot points.

Each lazy tongs 91 is formed by a plurality of pivotally interconnected parallel links 120, 121, 122, 123, 124, and 125 (FIG. 16). At its lower end, the first link 120 is pivotally mounted on a pivot bracket 126 mounted on one mounting plate leg 36 extending from the mounting plate 35, and is pivotally joined at its mid-point to a second link 121. At this pivot point, the links are pivotally secured to the sleeve gear 118 (FIG. 6), which is operatively engaged with the worm shaft 115. To provide a lost motion connection between the lazy tongs 91 and the roller housing 29, the upper end of the second link 121 includes a slide pin 127 operatively guided in a slot 128 in a slotted arm 129 swingably mounted at the opposite end from the slot on the main drive shaft 61 (FIGS. 9, 10, and 16). The lost motion connection between the second link 121 and the slotted arm 129 allows the lazy tongs to collapse for storage in a collapsed position (FIG. 12), as well as to extend and lift the top cover 20 over the roof 22 of the vehicle 21 (FIG. 17). In order to enable the lazy tongs 91 to collapse fully against the base plate 35 and plate legs 36, the slotted arm 129 is dog-legged in configuration as shown in FIGS. 12–18.

Opening the Top Cover and Housing Cover

Opening top cover 20 generally involves two steps. First, housing cover 48 is opened; second, lazy tongs 91 are lifted up and extended.

Figure 7:
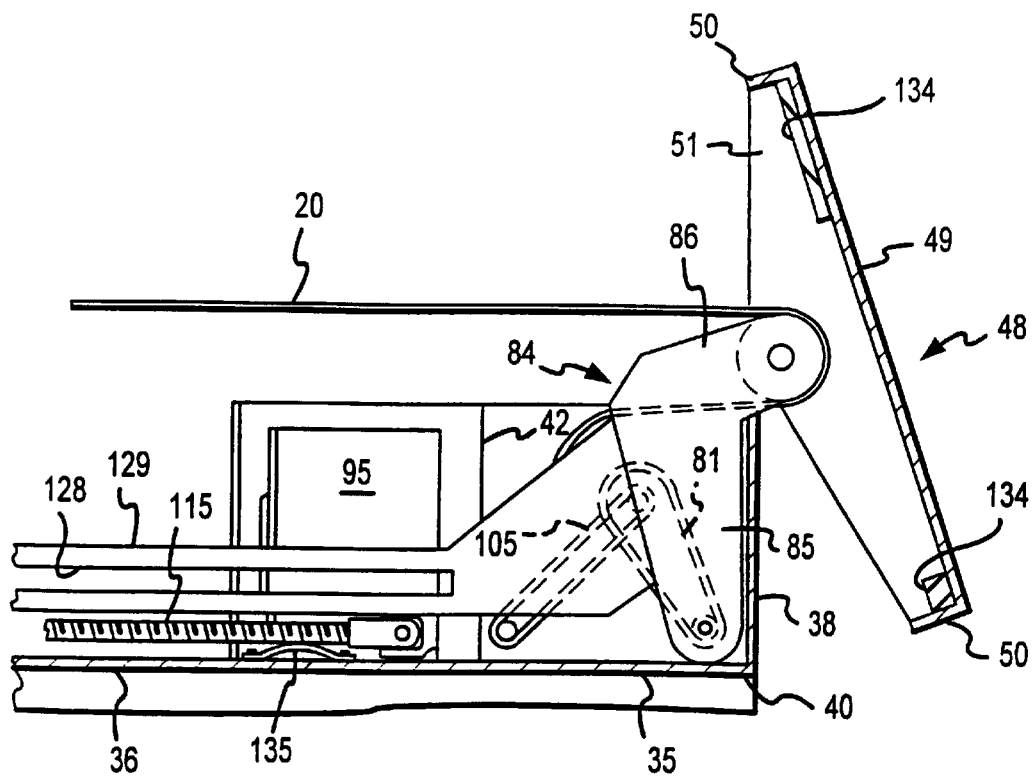
FIG. 7 is a further enlarged section view taken substantially in the plane of line 7—7 on FIG. 6.

For the first step, motor 65 is used to open housing cover 48. In particular, motor 65 rotates output drive shaft 66, which rotates cover drive shaft 68 through drive gear 69 and follows gear 70 (FIG. 9). Appropriate rotation of drive shaft 68 rotates bell crank 72 upward (away from roof 22), raising one side of housing cover 48 (FIGS. 8 and 9). Simultaneously, drive shaft 68 rotates tubular shaft 56 through drive belt or chain 78 connecting sprocket 75 on drive shaft 68 with sprocket 76 on tubular shaft 56 (FIG. 9). Tubular shaft 56 transfers the rotation to shaft 82 through drive belt or chain 81 connecting sprocket 79 on tubular shaft 56 with sprocket 80 on shaft 82 (FIGS. 7 and 10). Appropriate rotation of shaft 82 in turn rotates bell crank 84 upward (away from roof 22), raising the other side of housing cover 48 (FIGS. 7 and 10).

For the second step, motor 95 is used to lift up and extend lazy tongs 91, extending top cover 20 over vehicle roof 22 (FIGS. 6, 9, and 10). In particular, motor 95 rotates output shaft 96, which rotates drive shaft 98 through drive gear 99 and follower gear 100. Drive shaft 98 rotates output shaft 111 through gears 113, and output shaft 111 rotates worm shaft 115 through universal joint 116 (FIG. 10).

Output shaft 96 also causes rotation of worm shaft 115 on the other side of housing 29 (FIG. 9) through a mechanism linking motor 95 with worm shaft 115 on that side. In particular, drive shaft 98 causes rotation of main shaft 61 through drive belt or chain 105 connecting sprocket 102 on drive shaft 98 with sprocket 104 on main shaft 61. Main shaft 61 transfers rotation to drive shaft 109 through drive belt or chain 107 connecting sprocket 106 on main shaft 61 with sprocket 108 on drive shaft 109. Drive shaft 109 causes rotation of output shaft 112 though gears 114, and output shaft 112 rotates worm shaft 115 through universal joint 116 (FIG. 9).

Figure 13:
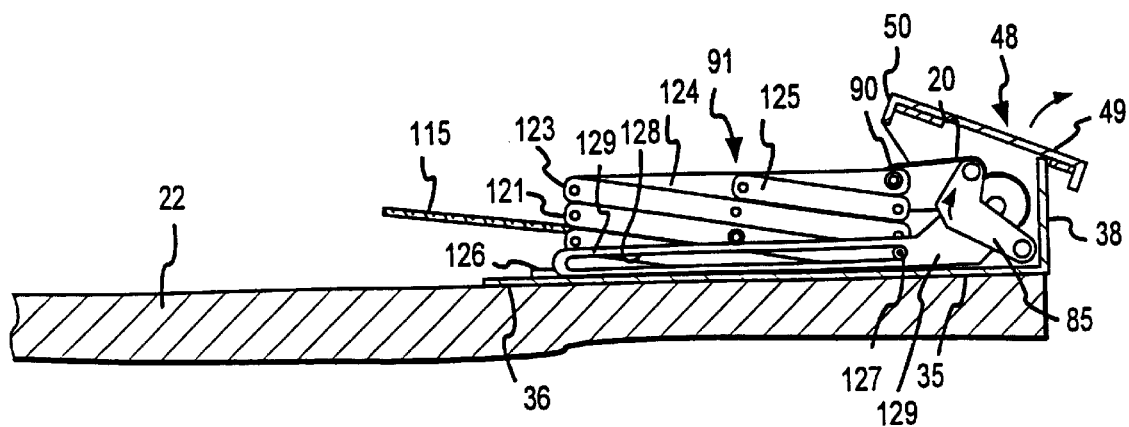
FIG. 13 is an enlarged section view similar to FIG. 12 but showing the retractable top cover in an initial deployment position.
Figure 15:
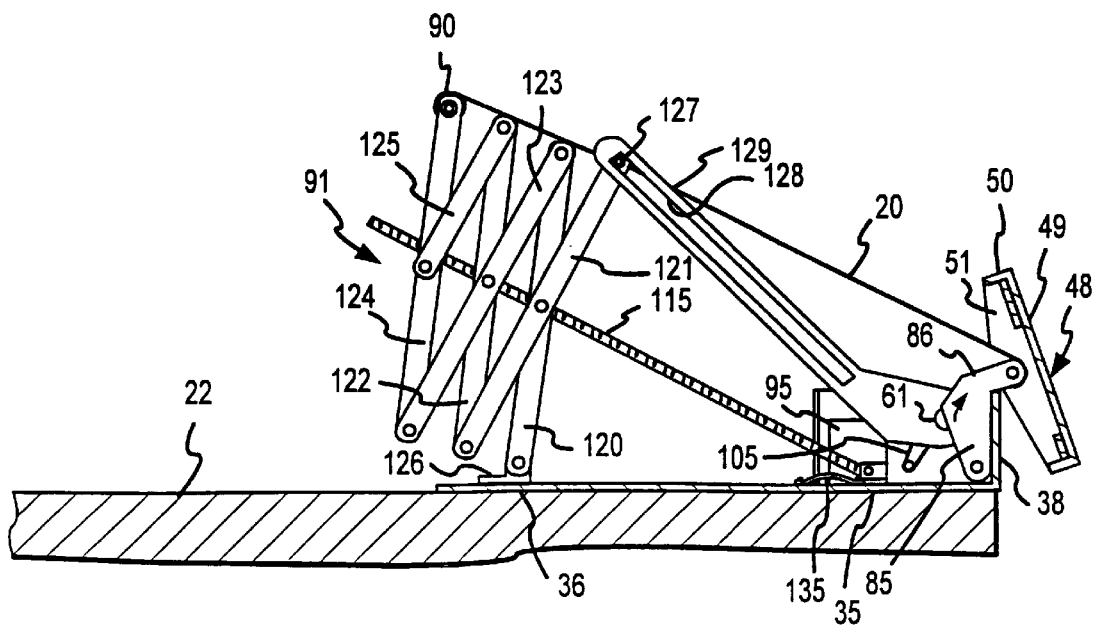
FIG. 15 is an enlarged section view similar to FIG. 14 but showing the retractable top cover in a still further deployed position.

Appropriate rotation of worm shaft 115 extends top cover 20. In particular, rotation of worm shaft 115 causes lateral, outward (away from chambers 46) movement of sleeve gear 118 (FIG. 6). Outward movement of sleeve gear 118 lifts up lazy tongs 91 by causing slide pin 127 to slide in slot 128 to the outward end of arm 129 (FIGS. 13 and 15). After lifting up lazy tongs 91, outward movement of sleeve gear 118 causes outward extension of links 120–125 (FIGS. 15–17) until lazy tongs 91 are fully extended (FIGS. 5 and 17).

The following provides further details concerning the opening of top cover 20. For extending the top cover 20, the top cover 20 and end rod 90 is secured to the free end of the end link 124 (FIG. 16). The links 120–125 are pivotally secured together at their mid-points or ends to provide the lazy tongs 91. As the lazy tongs 91 are extended by the worm shaft 115 as shown in FIGS. 12–17 inclusive, the top cover 20 is extended over the roof 22 of the vehicle 21. To provide an elevation of the top cover 20 over the vehicle roof 22, the top cover 20 passes from the storage roller 55 over an idler roller 130 (FIG. 8) extending between the end plates or panels 51 of the housing cover 48. In the fully extended position, the top cover 20 is secured by latches 132 (FIGS. 6, 16, and 17) to the roof 22 or side 25 of the vehicle 21.

Figure 12:
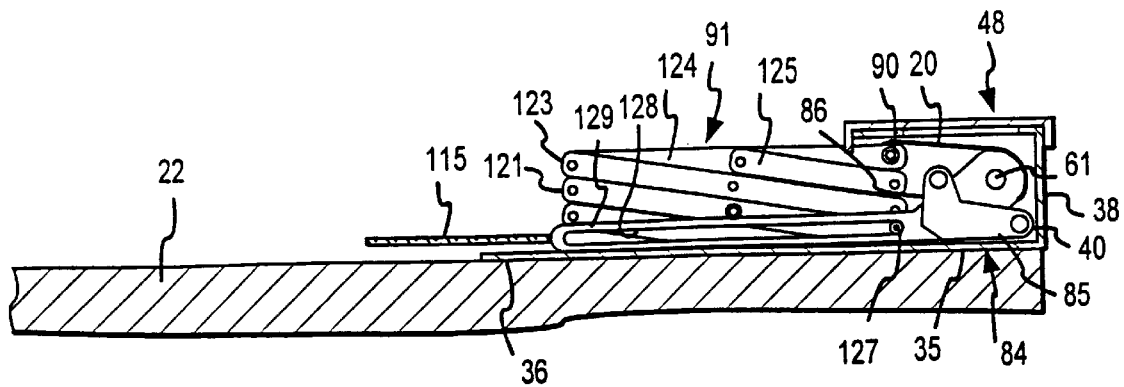
FIG. 12 is an enlarged section view taken substantially in the plane of line 12—12 on FIG. 3 and showing the retractable top cover in a retracted and stored position.

The operation of the lazy tongs 91 driven top cover 20 deployment is shown in FIGS. 12–18 inclusive. The top cover 20 is stowed for travel in a fully wound position on the spring biased roller 55 within the housing 29, with the housing cover 48 closed over the housing 29 (FIG. 12). The housing cover 48 is provided with resilient sealing strips 134 (FIG. 7) for engaging the upper edges of the housing walls.

Figure 14:
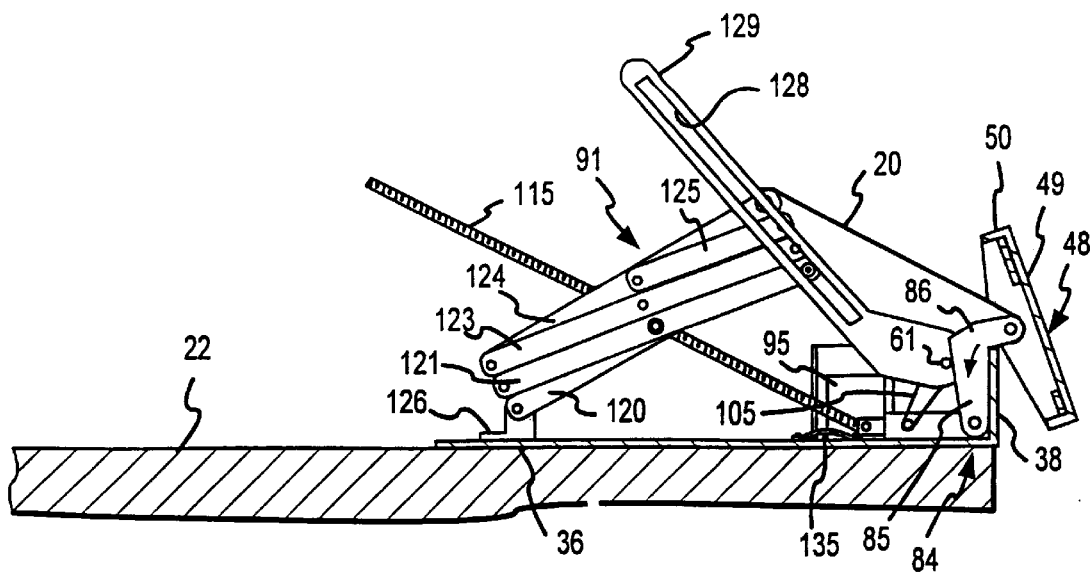
FIG. 14 is an enlarged section view similar to FIG. 13 but showing the retractable top cover in a further deployed position.

Before deployment, the lazy tongs 91 are completely collapsed (FIG. 12). To deploy the top cover 20 over the vehicle roof 22 according to the first embodiment, the housing cover 48 is lifted by actuation of the cover motor 65 (FIGS. 6 and 9), which swings the bell cranks 72, 84 upwardly and rearwardly to lift the housing cover 48 (FIGS. 12–14). Simultaneously, the idler roller 130 (FIG. 8), being attached to end plates 51, is lifted and the lazy tongs 91 are lifted upwardly by a leaf spring 135 (FIGS. 14–17) positioned in the base of the housing 29 as shown in FIG. 15.

After the housing cover 48 is fully opened, the worm shafts 115 are driven by the lazy tongs drive motor 95 (FIGS. 6 and 10) to lift the lazy tongs 91 out of the housing 29 and begin the unwinding of the top cover 20 from the storage roller 55. The lost motion connection provided by the slotted arm 129 allows the lazy tongs 91 to lift out of the stored position (FIGS. 13 and 14). When each lazy tongs 91 reaches the full limit of the lost motion connection provided by the slotted arm 129, further rotation of the lazy tongs worm shaft 115 opens the lazy tongs 91 and begins to extend the forward edge of the top cover 20 towards the opposite side of the vehicle (FIG. 15).

Further extension of the lazy tongs 91 extends the top cover 20 upwardly and outwardly over the roof 22 of the vehicle 21 to cover any extending apparatus or equipment 31 (FIG. 16). When fully extended (FIG. 17), the lazy tongs 91 extend across the roof 22 of the vehicle 21 pulling the top cover 20 towards the opposite vehicle edge where it is secured to the vehicle 21 with latch 132 (FIGS. 6 and 17). Upwardly extending apparatus 31 on the vehicle roof 22 can be covered or, as mentioned above, the top cover 20 may include appropriate openings 23 (FIG. 5).

Closing the Top Cover and Housing Cover

To stow the top cover 20 from its fully deployed position, the operation proceeds in a reverse direction as shown in FIGS. 17, 16, 15, 18, and 12, in that order. Initially, the top cover latch 132 is released and then the top cover 20 is retracted by reversing the direction of the top cover motors 65 and 95 (FIGS. 9 and 10) reversing the steps described above with respect to opening housing cover 48.

In particular, closing top cover 20 generally involves two steps. First, lazy tongs 91 are retracted and lowered down; second, housing cover 48 is closed.

For the first step, motor 95 is used to retract and lower down lazy tongs 91, retracting top cover 20 from over vehicle roof 22 (FIGS. 6, 9, and 10). In particular, motor 95 rotates output shaft 96, which rotates drive shaft 98 through drive gear 99, and follower gear 100. Drive shaft 98 rotates output shaft 111 through gears 113, and output shaft 111 rotates worm shaft 115 through universal joint 116 (FIG. 10).

Output shaft 96 also causes rotation of worm shaft 115 on the other side of housing 29 (FIG. 9) through a mechanism linking motor 95 with worm shaft 115 on that side. In particular, shaft 98 causes rotation of main shaft 61 through drive belt or chain 105 connecting sprocket 102 on shaft 98 with sprocket 104 on main shaft 61. Main shaft 61 transfers rotation to drive shaft 109 through drive belt or chain 107 connecting sprocket 106 on main shaft 61 with sprocket 108 on drive shaft 109. Drive shaft 109 causes rotation of output shaft 112 though gears 114, and output shaft 112 rotates worm shaft 115 through universal joint 116 (FIG. 9).

Figure 18:
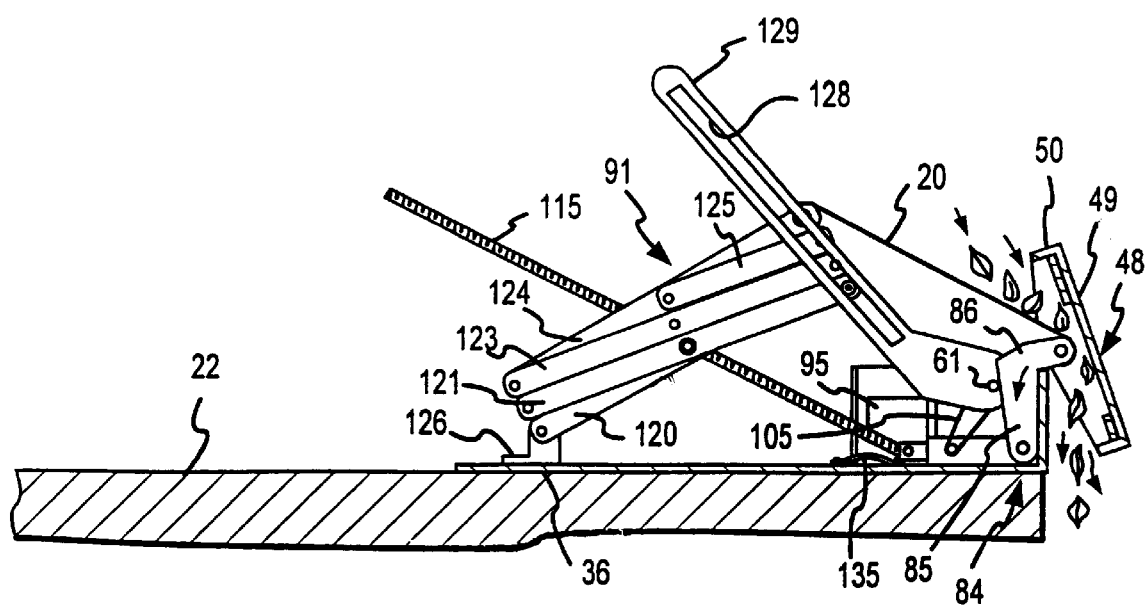
FIG. 18 is an enlarged section view similar to FIG. 14 but showing the retractable top cover being retracted and debris falling therefrom.

Appropriate rotation of worm shaft 115 retracts top cover 20. In particular, rotation of worm shaft 115 causes lateral, inward (toward chambers 46) movement of sleeve gear 118 (FIG. 6). Inward movement of sleeve gear 118 causes inward retraction of links 120–125 (FIGS. 17, 16, then 15) until lazy tongs 91 are fully retracted (FIGS. 1 and 18). After retracting lazy tongs 91, inward movement of sleeve gear 118 lowers down lazy tongs 91 by causing slide pin 127 to slide in slot 128 to the inward end of arm 129 (FIGS. 14, then 13).

For the second step, motor 65 is used to close housing cover 48. In particular, motor 65 rotates output drive shaft 66, which rotates cover drive shaft 68 through drive gear 69 and follower gear 70 (FIGS. 8 and 9). Appropriate rotation of drive shaft 68 rotates bell crank 72 downward (toward roof 22), lowering one side of housing cover 48 (FIGS. 8 and 9). Simultaneously, drive shaft 68 rotates tubular shaft 56 through drive belt or chain 78 connecting sprocket 75 on drive shaft 68 with sprocket 76 on tubular shaft 56 (FIG. 9). Tubular shaft 56 transfers the rotation to shaft 82 through drive belt or chain 81 connecting sprocket 79 on tubular shaft 56 with sprocket 80 on shaft 82 (FIGS. 7 and 10). Appropriate rotation of shaft 82 in turn causes rotation of bell crank 84 downward (toward roof 22), lowering the other side of housing cover 48 (FIGS. 7 and 10).

During retraction of top cover 20, debris may fall from the top cover 20 as shown in FIG. 18. When fully retracted, the housing cover 48 is closed to the position as shown in FIG. 12.

If desired, the lazy tongs 91 can be constructed to extend beyond the roof 22 of the vehicle 21 and over the opposite side wall 25 of the vehicle 21 to facilitate use of a portion of the top cover 20 as an awning for shading windows and doors of the vehicle 21. The lazy tongs 91 can also be extended or retracted by hydraulic piston and cylinder motors or other suitable drive mechanisms.

Motors 65, 95 are preferably electric motors powered by the electrical system of the vehicle 21. Alternatively, hydraulic motors or hand cranks may be utilized to open and close the housing cover 48 and extend or retract the top cover 20, as described above.

Alternate Embodiment

Figure 19:
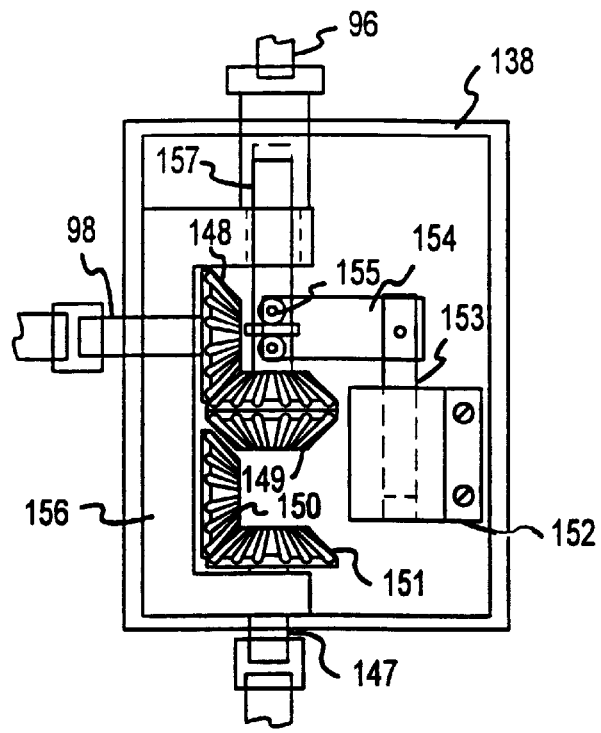
FIG. 19 is a top section view of the transmission box shown in FIG. 11 with a first shaft engaged.

A single motor 136 (FIG. 11) with a selectable transmission 138 (FIGS. 11, 19, and 20) may be used for operating both the housing cover 48 and the lazy tongs 91 (FIG. 11). In particular, motor 136 rotates drive shaft 98 using shaft 96 and a first position of transmission 138 (FIGS. 11 and 19). Drive shaft 98 causes rotation of worm shaft 115 as described above.

Figure 20:
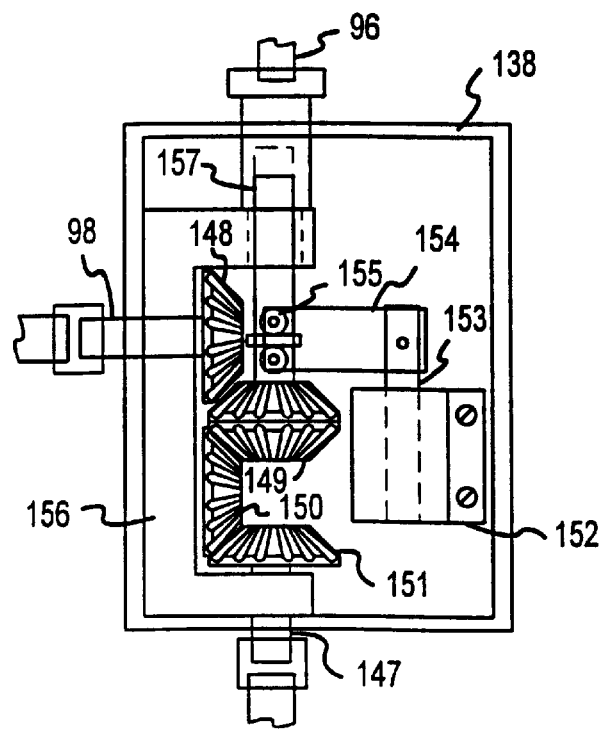
FIG. 20 is a top section view of the transmission box shown in FIG. 11 with a second shaft engaged.

Motor 136 rotates drive shaft 147 using shaft 96 and a second position of transmission 138 (FIGS. 11 and 20). Drive shaft 147 rotates shaft 82, through drive gear 145 and follower gear 146, to rotate bell crank 84 for raising and lowering housing cover 48 on one side of housing 29 (FIGS. 7 and 11). Shaft 82 also rotates tubular shaft 56 through belt or chain 81 connecting sprocket 80 on shaft 82 with sprocket 79 on tubular shaft 56 (FIG. 11). Tubular shaft 56 transfers rotation to the other side of housing 29 by rotating drive shaft 68 through belt or chain 78 connecting sprocket 76 on tubular shaft 56 with sprocket 75 on drive shaft 68 (FIG. 11).

Drive shaft 68 rotates bell crank 72 for raising and lowering housing cover 48 on the other side of housing 29 (FIGS. 8 and 11).

FIGS. 19 and 20 illustrate operation of transmission 138. Transmission 138 includes a mounting unit 156, and a gear 150 is rotatably mounted on unit 156. Shafts 96, 98, and 147 are also rotatably mounted on unit 156. Shaft 96 is slidably connected to a shaft 157 such that rotation of shaft 96 causes corresponding rotation of shaft 157, and shaft 157 may slide laterally along an axis of shaft 96. An end of shaft 157 includes a gear 149, an end of shaft 98 includes a gear 148, and an end of shaft 147 includes a gear 151. Transmission 138 also includes a control box 152 connected with an arm 153, which is fixedly connected with arm 154. Arm 154 is coupled to shaft 96 through bearings 155, permitting rotation of shaft 96.

Transmission 138 includes two positions, one for driving shaft 98 and another for driving shaft 147. Transmission 138 is shifted between the two positions by movement of arms 153 and 154 through control box 152. A mechanism (not shown) external to transmission 138 permits lateral movement of arm 153, which causes arm 154 to move shaft 157 laterally along an axis of shaft 96 in order for gear 149 to engage either gear 148 or gear 150. In a first position (FIG. 19), gear 149 engages gear 148 in order to drive shaft 98. In a second position (FIG. 20), gear 149 engages gear 150, which in turn engages gear 151 to drive shaft 147.

While the present invention has been described in connection with an exemplary embodiment, it will be understood that many modifications will be readily apparent to those skilled in the art, and this application is intended to cover any adaptations or variations thereof. For example, different types of motors, shafts, gears, and linkages between shafts may be used without departing from the scope of the invention. This invention should be limited only by the claims and equivalents thereof.

What is claimed is:

1. A retractable top cover for covering a roof of a vehicle, the vehicle having opposed side walls and opposed end walls with the roof surmounting the walls, the retractable top cover comprising:

an elongated housing adapted to be mounted on the roof of the vehicle adjacent to and extending along an edge of the roof adjacent one of the side walls the housing having first and second ends;

a spring biased roller mounted in the housing and extending substantially the length of the housing;

a flexible top cover wound on the roller and having a first and second spaced parallel end edges, the first end edge being secured to the roller;

a pair of lazy tongs each tong having two ends, wherein one of the tong ends is mounted at one of the first and second ends of the housing and wherein the other tong end is attached to a bar secured to the second end edge of the flexible top cover;

a top cover drive motor; and a pair of worm shafts operatively coupling the cover drive motor to each of the lazy tongs for extending the lazy tongs to pull the flexible top cover from the roller and deploy the flexible top cover across the roof of the vehicle.

2. The retractable top cover of claim 1 wherein each of the worm shafts comprises a gear and shaft mechanism operatively connecting the top cover drive motor to a worm shaft.

3. The retractable top cover of claim 2 wherein the gear and shaft mechanism includes a central main shaft coaxial with the roller.

4. The retractable top cover of claim 1 wherein each the lazy tongs includes a lost motion linkage operatively connecting the lazy tongs to the housing for lost motion movement with respect to the housing.

5. The retractable top cover of claim 1, further comprising a housing cover on the elongated housing.

6. The retractable top cover of claim 5, further comprising a motor and gear drive mechanism operatively connected to the housing cover for lifting the housing cover off of the housing.

7. The retractable top cover of claim 6 wherein the motor and gear drive mechanism includes a tubular shaft coaxial with and journaling the roller.

8. The retractable top cover of claim 7 wherein the tubular shaft is journaled on the housing.

9. The retractable top cover of claim 8 wherein the main shaft is journaled in the tubular shaft.

10. The retractable top cover of claim 6, wherein the housing comprises two ends, the retractable top cover further comprising a pair of bell cranks, one pivotally mounted to each end of the housing, affixed to a respective end of the housing cover, and operatively connected to the motor and gear drive mechanism.

11. The retractable top cover of claim 1 wherein each of the worm shafts comprises a threaded shaft, a universal coupling connecting the threaded shaft to the top cover drive motor, and an internally threaded sleeve mounted on the lazy tongs and operatively engaging the worm shafts, whereby rotation of the shaft moves the lazy tongs to deploy or retract the flexible top cover.

12. The retractable top cover of claim 1 wherein the flexible top cover comprises a fabric.

13. The retractable top cover of claim 1 wherein the flexible top cover defines openings for receiving roof mounted apparatus on the vehicle.

14. The retractable top cover of claim 10 wherein the top cover drive motor of the motor and gear drive mechanism and the drive motor are the same motor and are operatively connected to the lazy tongs and the housing cover by a selectable transmission.

15. A retractable top cover for covering a roof of a vehicle, the vehicle having opposed side walls and opposed end walls with the roof surmounting the walls, the retractable top cover comprising:

an elongated housing adapted to be mounted on the roof of the vehicle adjacent to and extending along an edge of the roof adjacent one of the side walls the housing having first and second ends;

a spring biased roller mounted in the housing and extending substantially the length of the housing;

a flexible top cover wound on the roller and having a first and second spaced parallel end edges, the first end edge being secured to the roller;

a pair of lazy tongs each tong having two ends, wherein one of the tong ends is mounted at one of the first and second ends of the housing and wherein the other tong end is attached to a bar secured to the second end edge of the flexible top cover; and means for extending the lazy tongs to pull the flexible top cover from the roller and deploy the flexible top cover across the roof of the vehicle.

16. The retractable top cover of claim 15 wherein the extending means comprises a drive motor and a gear and shaft mechanism operatively connecting the drive motor to the lazy tongs.

17. The retractable top cover of claim 15, further comprising:

a housing cover on the elongated housing; and means for opening and closing the housing cover.

18. A method of deploying a flexible top cover over a roof of a vehicle using a mechanism including a lazy tongs having the flexible top cover attached at one end, the mechanism being contained in a housing located on the roof of the vehicle and having a housing cover, the method comprising:

opening the housing cover;

lifting up the lazy tongs; and extending the lazy tongs in order to extend the flexible top cover over the roof of the vehicle.

19. The method of claim 18 wherein the opening step includes lifting the housing cover up and rotating it away from the roof of the vehicle.

20. The method of claim 18 wherein the lifting step includes lifting up the lazy tongs in a folded configuration.

* * * * *